US006805148B2

(12) United States Patent
Progin et al.

(10) Patent No.: US 6,805,148 B2
(45) Date of Patent: Oct. 19, 2004

(54) RELIEF-VALVE JET

(75) Inventors: Pascal Progin, Vuadens (CH); Erich Eckhardt, Sorens (CH); Franz-Josef Schwede, Murten (CH)

(73) Assignee: Liebherr-Machines Bulle S.A., Bulle (CH)

( * ) Notice: Subject to any disclaimer, the term of this patent is extended or adjusted under 35 U.S.C. 154(b) by 87 days.

(21) Appl. No.: 10/164,962

(22) Filed: Jun. 7, 2002

(65) Prior Publication Data

US 2003/0015237 A1 Jan. 23, 2003

(30) Foreign Application Priority Data

Jun. 7, 2001 (DE) .................................... 201 09 476 U

(51) Int. Cl.[7] ................................................ F16K 11/07
(52) U.S. Cl. ....................................... 137/112; 137/488
(58) Field of Search ................................. 137/112, 488

(56) References Cited

U.S. PATENT DOCUMENTS

| | | | | |
|---|---|---|---|---|
| 357,191 A | * | 2/1887 | Fell | 137/512.1 |
| 2,811,979 A | * | 11/1957 | Presnell | 137/112 |
| 4,520,626 A | * | 6/1985 | Nakajima et al. | 60/468 |
| 5,036,877 A | | 8/1991 | Distler et al. | 137/489 |

FOREIGN PATENT DOCUMENTS

| | | |
|---|---|---|
| DE | 3921292 | 1/1991 |
| DE | 4100231 | 7/1991 |
| DE | 4446142 | 6/1996 |
| DE | 19744337 | 4/1999 |
| GB | 2239935 | 7/1991 |

* cited by examiner

*Primary Examiner*—Stephen M. Hepperle
(74) *Attorney, Agent, or Firm*—Dilworth & Barrese LLP.

(57) ABSTRACT

The invention concerns a pressure-limiting valve to limit the pressure of hydraulic oil which can be admitted through two intakes, consisting of a control rod in a cylindrical housing equipped with the two intakes, which can be moved against spring force, which, when one intake is exposed to oil under high pressure, connects the other intake supplied with oil kept under low pressure to an outlet leading to the pressure-limiting valve.

A pressure-limiting valve of simple construction, which easily installed, is achieved through the fact that the control rod is provided with an axial hole in which a second control rod can be moved against the force of at least one limiting spring adjusted to the pressure to be limited, and that the first control rod, depending on which of the two intakes is subjected to the high pressure, is pushed into a position in which the second control rod connects the intake that is under low pressure to an outlet opening, while overcoming the force of the limiting spring.

20 Claims, 4 Drawing Sheets

RELIEF-VALVE JET

BACKGROUND OF THE INVENTION

The invention concerns a pressure-limiting valve to limit the pressure of hydraulic oil which can be admitted through two intakes, consisting of a control rod in a cylindrical housing equipped with the two intakes, which can be moved against spring force, which, when one intake is exposed to oil under high pressure, connects the other intake supplied with oil kept under low pressure to an outlet leading to the pressure-limiting valve.

Such a pressure-limiting valve is useful, for example, in a hydraulic motor, preferably a hydraulic axial piston motor, which is fed with oil under pressure in a closed circuit from an adjustable pump, preferably a slant piston axial adjustable pump, where the valve arrangement is pushed by the high-pressure side into a position in which the low pressure side is connected to the tank through the pressure-limiting valve, so that oil can be fed into the tank from the low-pressure side against the pressure provided by the pressure-limiting valve, and cool hydraulic oil for compensation can be fed into the circulation by the check valve.

A valve arrangement of this known type is described briefly using FIG. 1, which shows a partial section of a connection plate of a hydraulic axial piston motor. A 4/2-way valve 90 is screwed into a hole in the connection plate, which is provided with annular steps, whose control rod 91, which is movable against spring force and which is provided with 2 pistons, is pushed by the high pressure that lies either at hole 92 or hole 93 into a position in which always the other hole, which is provided with low pressure, is connected to the outlet 95 through the annular space 94 which lies between the pistons of the control rod, which opens into the intake side of the pressure-limiting valve 96, which is screwed into the hole 97 in the connection plate and which is provided with annular steps.

FIG. 2 shows a schematic diagram of the valves shown in FIG. 1 and combined with each other.

The known valve system is complex, since it consists of two valves combined with each other, each of which must be placed in its own hole, for example, in a connection plate, and which must be connected to each other.

SUMMARY OF THE INVENTION

The problem to be solved by the invention is therefore to create a combined valve of the type indicated at the beginning, which is marked by a simpler structure and which can be installed more simply.

According to the invention, this problem is solved by providing the control rod with an axial hole, in which a second control rod is movable against the force of at least one limiting spring that is adjusted to the pressure to be limited, and placing the first control rod in a position depending upon which of the two inputs is subjected to high pressure, in which position the second control rod connects the input that is exposed to low pressure to an outgoing opening while overcoming the force of the limiting spring.

The pressure-limiting valve combined with a multiple-way valve in accordance with the invention is outstanding due to the fact that it is housed in a single, essentially cylindrical housing, and therefore can be installed in a hole, for example, in a connection plate.

Preferably, the first control rod is provided with pistons and/or annular pistons in the area of its ends, where the cylinder chambers that are set off by them from the housing are in communication, each with one of the intakes, in such a manner that the intake subjected to high pressure pushes the control rod into a position in which the other intake comes into communication with the output opening of the second control rod, through the low pressure.

It is advantageous for the first control rod to be equipped with an axial pin extending through a coiled spring, which, on the basis of spring disks guided by the pin, between which it is clamped, then has a double effect, so that the outer spring disk is graced against a stop on the pin and the internal spring is braced against an annular step on the inside end of the pin and both spring disks rest against annular steps of the housing.

In a further embodiment of the invention, the second control rod is provided in the area of its ends with pistons and/or annular pistons, which form cylinder chambers with the axial hole of the first control rod, where, by moving the first control rod, one of the cylinder chambers is placed in communication with the intake provided with low pressure, and connects this cylinder chamber with the outlet opening by moving the second control rod.

The second control rod can be provided with annular chambers between the pistons or annular pistons at the end, and a center blocker which, in its rest position, closes the outflow opening, which annular chambers communicate with the cylinder chambers by means of holes.

It is advantageous if one side of the second control rod is provided with a double-action pressure spring placed on a pin in a manner corresponding to the first control rod.

The housing of the first control rod advantageously consists of two parts, which screw together in order to make possible simple assembly of the second control rod.

BRIEF DESCRIPTION OF THE DRAWINGS

A sample embodiment of the invention is described below in greater detail, using the drawings. In the drawings, the following is shown.

DESCRIPTION OF THE PREFERRED EMBODIMENTS

Figure 1:
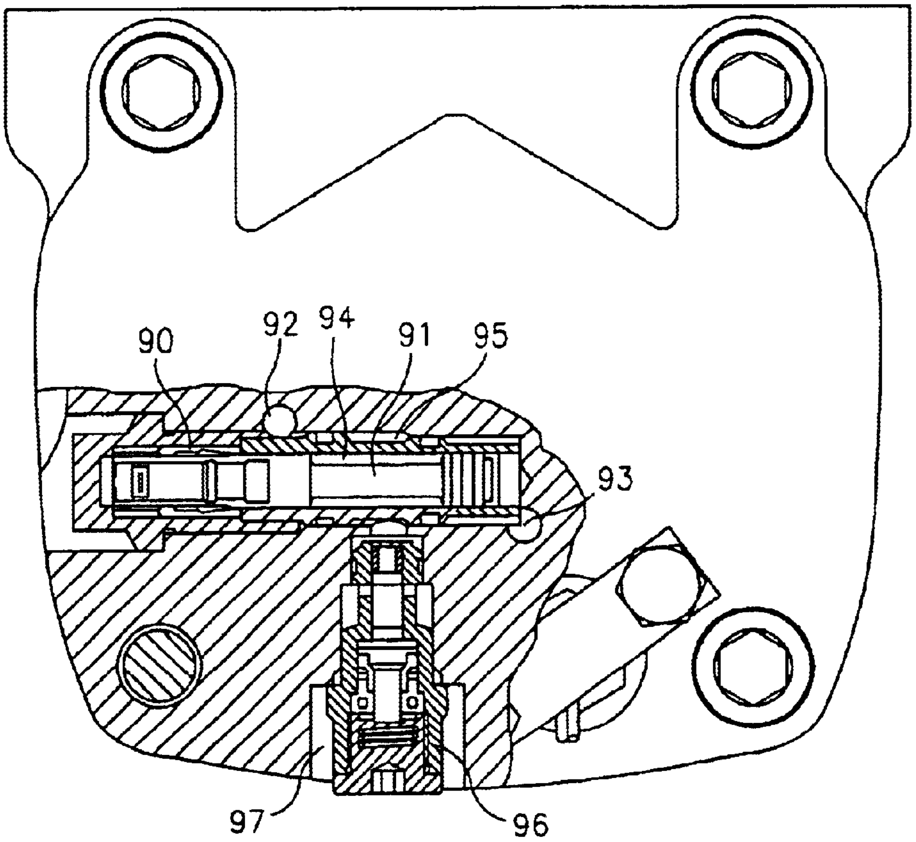
FIG. 1 (PRIOR ART)
FIG. 1 a partial sectional veiw of a known pressure-limiting valve.
Figure 2:
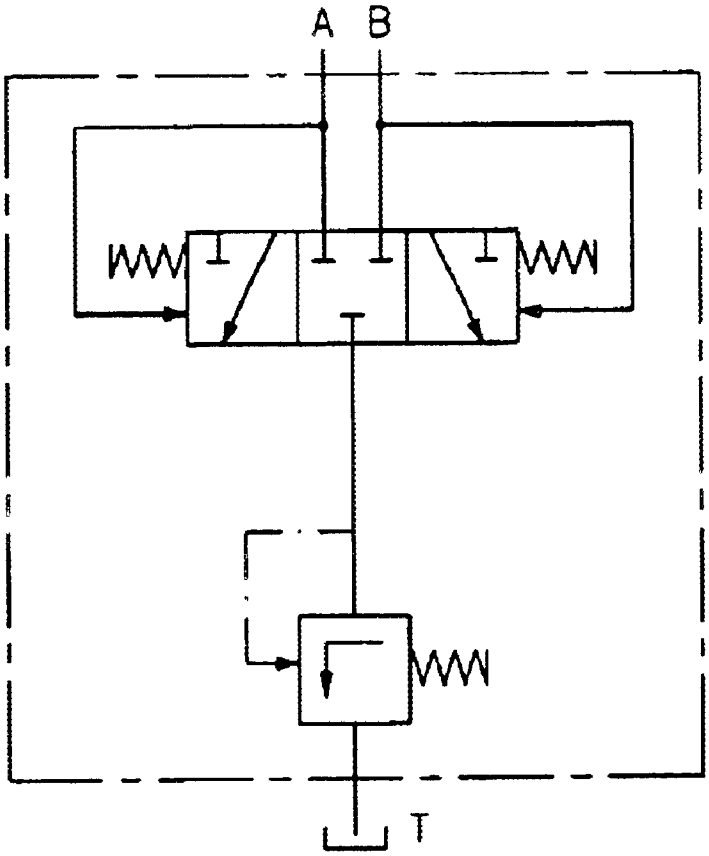
FIG. 2 (PRIOR ART)
FIG. 2 a schematic diagram of the known valve shown in FIG. 1.

The valve in accordance with the invention, made up of the combination of a way valve with a pressure-limiting valve, consists of a cylindrical housing 1, provided with annular collars and annular steps, in which a first control rod is guided in such a manner that it can be moved against the force of a double-action pressure spring 2, which consists of the parts 3, 4, which are screwed together. The first control rod 3, 4 is provided with an axial hole in which a second control rod 5 is guided in such a manner that it can be moved longitudinally against the force of a double action pressure spring 6.

The first control rod 3, 4 consists of the shell-shaped part 3, which, on its open end, has an internal thread 7, into which the external thread of the part 4, which closes the open end of the shell-shaped part 3, is screwed. The tubular housing 1 is provided with an internal thread on its left end, into which the closing part 8 is screwed.

The first control rod 3, 4 is held in its rest position in the hole in the housing part 1 by the pressure spring 2 seated on the plug-shaped extension 9 of the part 4, which is clamped between the movable spring disks 10, 11, movably on the plug-shaped extension 9. The spring disk 10 is supported in the rest position on an annular collar 12 of the part 4, and on an annular step 13 of the hole in the housing part 1. The spring disk 11 is supported in the rest position on the ring 14, which is inset into a slot of the plug 4 and the annular inner surface 15 of the plug-shaped part 8 which is screwed in. In order to permit a leftward movement of the control rod 3, 4, the plug-shaped part 8 is provided with a dead-end hole 16.

The second control rod 5 is equipped with two pistons or annular pistons 18, 19, which run in the hole section 17 of part 3. Between these pistons 18, 19, the shaft of the second control rod 5 is provided with a blocker 20, which, in its rest position, blocks radial holes 21 of the part 3 of the first control rod, which opens into an annular groove 22 of the housing 1, which communicates with radial holes T, which for example lead to a tank.

The left annular piston 19 of the second control rod 9 is provided with a plug-shaped extension 23 on which the spring disks 24, 25 are guided and fastened in a corresponding manner as on the plug-shaped extension 9 of the first control rod 3, 4. The spring 6 holds the second control rod 5 in its position blocking the outlets T by the fact that the right spring portion 24 is braced on the piston 19 and an annular step of the hole of the part 3 of the first control rod. The spring disk 25, in its rest position, is braced against the annular surface of a step of the hole, which in placed in the part 4 and which continues through a blind hole 27, in which the plug 23 can be inserted.

On both sides of the holes T leading to the tank, the housing 1 is provided with radial holes A and B, of which one is provided with oil under high pressure and the other with oil under low pressure. If the holes B are subjected to high pressure, the front surface of the plug 4 and the annular surfaces 28, 29, 30 are subject to pressure so that the rod 31, which partially covers the intakes B, is pushed rightward against the force of the spring 2, so that the annular piston-shaped rod 32, which partially covers the holes A, is pushed rightward and places the intake A, which is subject to low pressure, into communication with the annular groove 33, which opens into the annular space 35 between the piston 18 and the blocker 30, through the holes 34. The annular space 35 communicates with the cylinder chamber 38 through the hole 37, which cylinder chamber is formed between the piston 18 and the end of the hole of the part 3 of the first control rod. If the low pressure to which the annular piston surface is exposed overcomes the limiting spring 6, the second control rod is pushed leftward, so that the blocker 20 opens the holes 21 leading to the tank.

If the high pressure is on the openings A, then the first control rod is pushed leftward by the pressure applied to its right side surfaces 40, 41 against the force of spring 2, so that in a corresponding manner the hole B, which is under low pressure, is brought into communication in a corresponding manner, with the annular space 44 through the annular groove 42 and the hole 43, which annular space is formed between the left piston 19 and the blocker 30. The annular space 44 communicates through the hole 45 with the space in which the pressure spring 6 is located. If the pressure applied to the front surface of the pin 23 overcomes the pressure of spring 6, the second control rod is pushed far enough rightward that the blocker 20 opens the path to the tank T.

Figure 3:
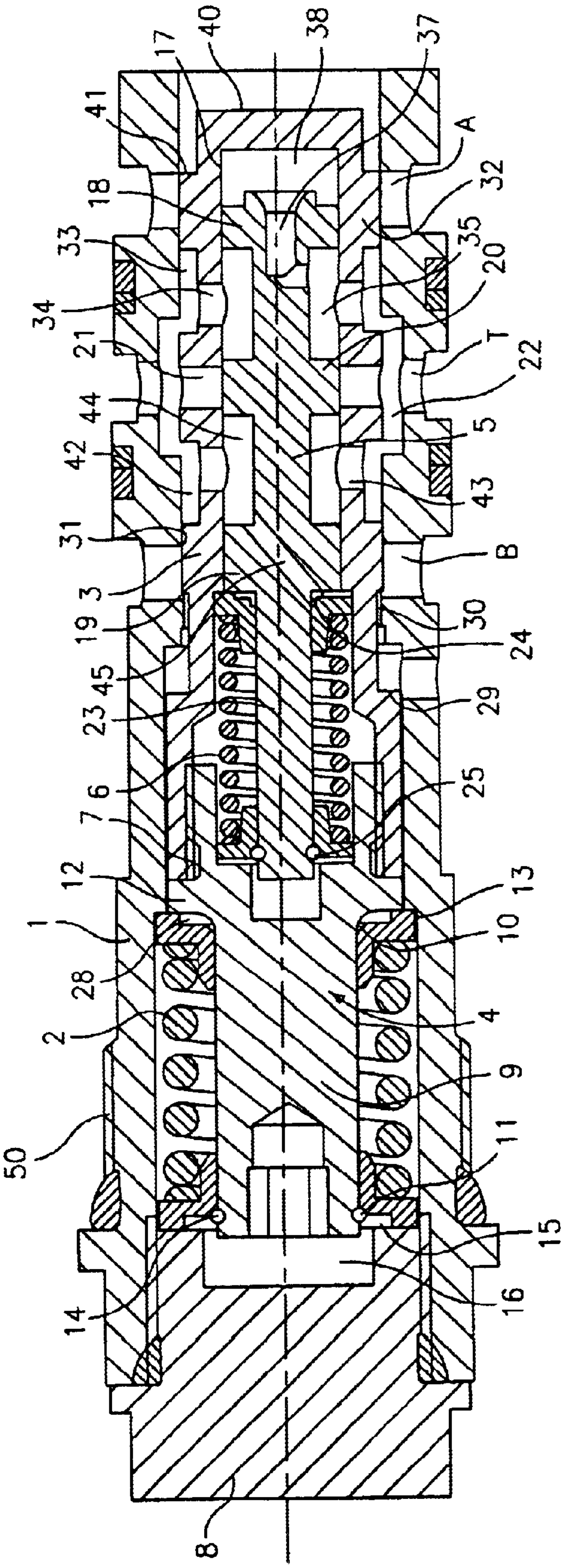
FIG. 3 a lengthwise section through the valve, in accordance with the invention, and FIG. 4 a longitudinal section corresponding to FIG. 3 through the valve in its condition as screwed into a housing hole.
Figure 4:
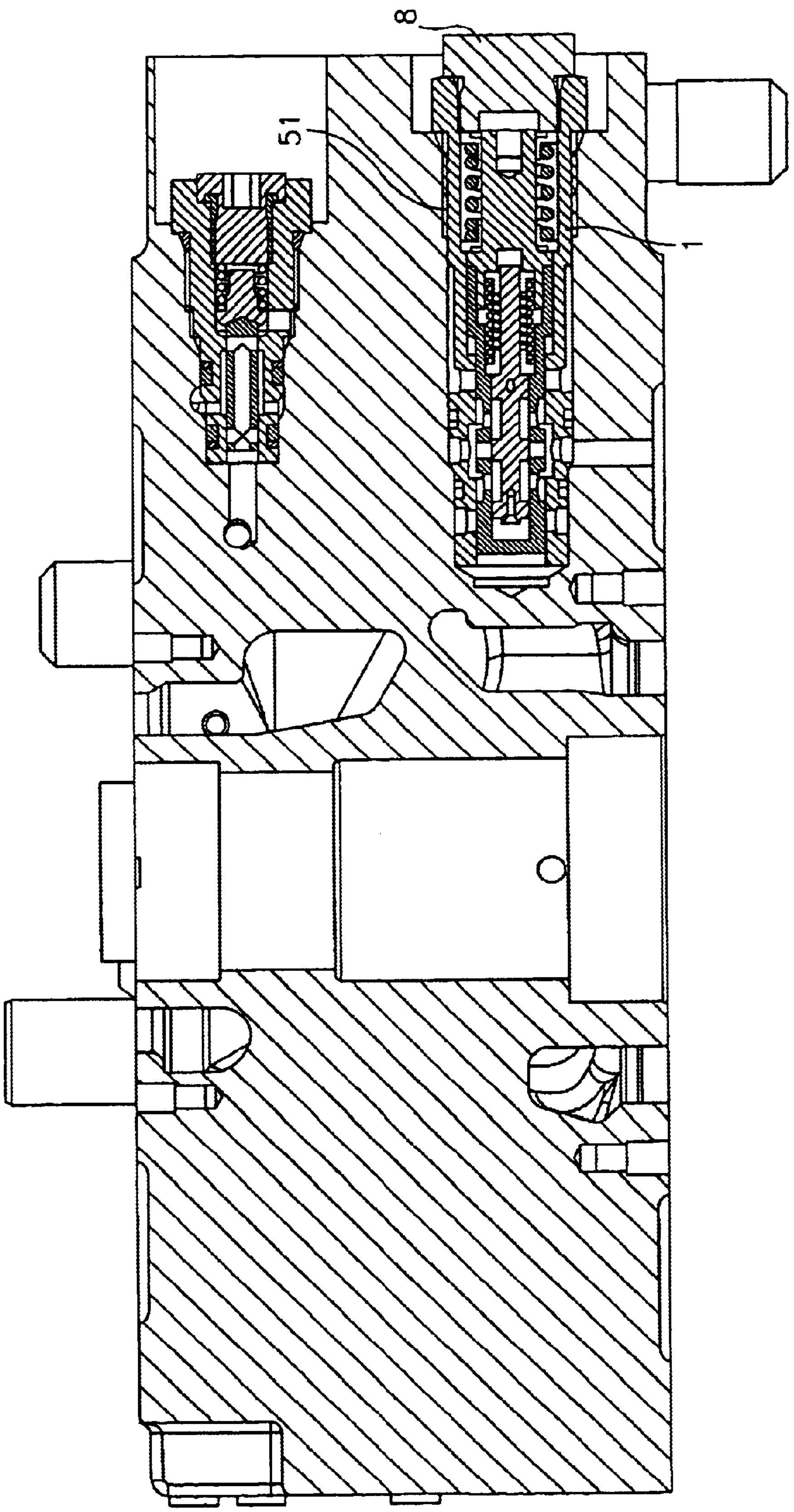

FIG. 4 shows the valve described on the basis of FIG. 3 in its position in which it is screwed into a hole in the motor housing. The housing 1 is provided with an outside thread 50, behind an annular collar into which a sealing ring is placed, which is screwed into an inside thread 51 of the housing hole.

In annular grooves of the housing 1, sealing rings are placed, in the usual manner, which seal off the circulating paths that must be separated from each other.

What is claimed is:

1. Pressure limiting valve to limit the pressure of hydraulic oil which can be admitted through two intakes comprising a control rod (3, 4), which is movable against spring force within a cylindrical housing (1) provided with the two intakes (A,B), which, when upon exposure of one of the intakes (A,B) with oil under high pressure, connects the other intake, which is supplied with oil under low pressure to an outlet leading to a pressure-limiting valve, characterized in that, the control rod (3, 4) is provided with an axial hole, in which a second control rod (5) is movable against the force of at least one limiting spring (6) adjusted to the pressure to be limited, and that the first control rod (3,4), depending upon which of the two intakes (A,B) is exposed to high pressure, is pushed into a position in which the second control rod (5) connects to the intake (A,B) under low pressure to an outlet opening (T), while overcoming the force of the limiting spring (6).

2. Valve according to claim 1, characterized in that the first control rod (3, 4) is provided in the area of its ends with pistons and/or annular pistons forming rods, and that the cylinder chambers separated by them from the housing 1 are in communication each with one of the intakes (A, B) in such a manner that the intake under high pressure places the first control rod (3, 4) into a position in which the other intake, after movement of the second control rod, due to the lower pressure, comes into communication with the outlet opening (T).

3. Valve according to claim 1, characterized in that the first control rod (3, 4) extends through a coil pressure spring (2) with an axial pin (9), which spring, as a result of the spring disks (10, 11) attached to the pin (9) between which it is clamped, is therefore a double-action spring, so that outside spring disk (11) is braced against a stop (14) of the pin (9) and the inner spring disk (10) is braced against an annular step (28) on the inner end of the pin and both spring disks rest against annular steps of the housing (1, 8).

4. Valve according to claim 1, characterized in that the second control rod (5) is provided with pistons and/or annular pistons (18, 19) in the area of its ends, which form cylinder chambers with the axial hole of the first control rod (3, 4), that through movement of the first control rod (3, 4), one of the cylindrical chambers comes into communication with the intake (A or B) which is supplied with low pressure, and connects this cylinder chamber to the outlet opening (T) through movement of the second control rod (5).

5. Valve according to claim 1, characterized in that the second control rod (5) is equipped with annular chambers (34, 35) between pistons or annular pistons on its ends (18, 19) and a central annular control rod (30) which in its rest position closes the exit opening (21, T), which communicate with the cylinder chambers through the holes (37, 45).

6. Valve according to claim 3, characterized in that one side of the second control rod (5) is equipped with the double-action pressure spring (6) arranged on a pin (23).

7. Valve according to claim 1, characterized in that the housing of the first control rod comprises two parts (1, 8) screwed together.

8. Valve according to claim 2, characterized in that the first control rod (3, 4) extends through a coil pressure spring (2) with an axial pin (9), which spring, as a result of the spring disks (10, 11) attached to the pin (9) between which it is clamped, is therefore a double-action spring, so that outside spring disk (11) is braced against a stop (14) of the pin (9) and the inner spring disk (10) is braced against an annular step (28) on the inner end of the pin and both spring disks rest against annular steps of the housing (1, 8).

9. Valve according to claim 2, characterized in that the second control rod (5) is provided with pistons and/or annular pistons (18, 19) in the area of its ends, which form cylinder chambers with the axial hole of the first control rod (3, 4), that through movement of the first control rod (3, 4), one of the cylindrical chambers comes into communication with the intake (A or B) which is supplied with low pressure, and connects this cylinder chamber to the outlet opening (T) through movement of the second control rod (5).

10. Valve according to claim 3, characterized in that the second control rod (5) is provided with pistons and/or annular pistons (18, 19) in the area of its ends, which form cylinder chambers with the axial hole of the first control rod (3, 4), that through movement of the first control rod (3, 4), one of the cylindrical chambers comes into communication with the intake (A or B) which is supplied with low pressure, and connects this cylinder chamber to the outlet opening (T) through movement of the second control rod (5).

11. Valve according to claim 8, characterized in that the second control rod (5) is provided with pistons and/or annular pistons (18, 19) in the area of its ends, which form cylinder chambers with the axial hole of the first control rod (3, 4), that through movement of the first control rod (3, 4), one of the cylindrical chambers comes into communication with the intake (A or B) which is supplied with low pressure, and connects this cylinder chamber to the outlet opening (T) through movement of the second control rod (5).

12. Valve according to claim 2, characterized in that the second control rod (5) is equipped with annular chambers (34, 35) between pistons or annular pistons on its ends (18, 19) and a central annular control rod (30) which in its rest position closes the exit opening (21, T), which communicate with the cylinder chambers through the holes (37, 45).

13. Valve according to claim 3, characterized in that the second control rod (5) is equipped with annular chambers (34, 35) between pistons or annular pistons on its ends (18, 19) and a central annular control rod (30) which in its rest position closes the exit opening (21, T), which communicate with the cylinder chambers through the holes (37, 45).

14. Valve according to claim 4, characterized in that the second control rod (5) is equipped with annular chambers (34, 35) between pistons or annular pistons on its ends (18, 19) and a central annular control rod (30) which in its rest position closes the exit opening (21, T), which communicate with the cylinder chambers through the holes (37, 45).

15. Valve according to claim 8, characterized in that the second control rod (5) is equipped with annular chambers (34, 35) between pistons or annular pistons on its ends (18, 19) and a central annular control rod (30) which in its rest position closes the exit opening (21, T), which communicate with the cylinder chambers through the holes (37, 45).

16. Valve according to claim 9, characterized in that the second control rod (5) is equipped with annular chambers (34, 35) between pistons or annular pistons on its ends (18, 19) and a central annular control rod (30) which in its rest position closes the exit opening (21, T), which communicate with the cylinder chambers through the holes (37, 45).

17. Valve according to claim 8, characterized in that one side of the second control rod (5) is equipped with the double-action pressure spring (6) arranged on a pin (23).

18. Valve according to claim 10, characterized in that one side of the second control rod (5) is equipped with the double-action pressure spring (6) arranged on a pin (23).

19. Valve according to claim 11, characterized in that one side of the second control rod (5) is equipped with the double-action pressure spring (6) arranged on a pin (23).

20. Valve according to claim 13, characterized in that one side of the second control rod (5) is equipped with the double-action pressure spring (6) arranged on a pin (23).

* * * * *